US006866322B2

(12) United States Patent
Willard

(10) Patent No.: US 6,866,322 B2
(45) Date of Patent: Mar. 15, 2005

(54) AUTOMOTIVE VEHICLE ROOF SYSTEM HAVING A DETACHABLE CONVERTIBLE ROOF

(75) Inventor: Michael T Willard, Macomb County, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/360,012

(22) Filed: Feb. 6, 2003

(65) Prior Publication Data

US 2004/0155479 A1 Aug. 12, 2004

(51) Int. Cl.$^7$ .................................................. B60J 7/00
(52) U.S. Cl. .......................... 296/107.01; 296/107.07; 296/146.14; 296/107.09; 296/107.12
(58) Field of Search ................. 296/107.07, 146.14, 296/121, 107.01, 107.09, 107.12, 107.15

(56) References Cited

U.S. PATENT DOCUMENTS

| | | | | |
|---|---|---|---|---|
| 1,426,129 A | * | 8/1922 | Velo | 296/107.09 |
| 1,940,911 A | * | 12/1933 | Howatt | 296/107.12 |
| 3,195,549 A | | 7/1965 | Stevens | |
| 3,276,814 A | | 10/1966 | Podolan | |
| 3,333,362 A | * | 8/1967 | Kostin et al. | 296/146.14 |
| 4,170,847 A | | 10/1979 | Pickles | |
| 4,543,747 A | * | 10/1985 | Kaltz et al. | 296/146.14 |
| 4,695,089 A | | 9/1987 | Fukutomi et al. | |
| 4,700,982 A | | 10/1987 | Kuraoka et al. | |
| 4,817,999 A | | 4/1989 | Drew | |
| 4,832,397 A | | 5/1989 | Scaduto | |
| 4,850,634 A | | 7/1989 | Taubitz | |
| 4,971,370 A | | 11/1990 | Detweiler et al. | |
| 4,979,384 A | | 12/1990 | Malesko et al. | |
| 5,101,596 A | | 4/1992 | Moore | |
| 5,299,850 A | | 4/1994 | Kaneko et al. | |
| 5,337,519 A | | 8/1994 | Bergesio | |
| 5,775,767 A | | 7/1998 | Harrison et al. | |
| 5,998,948 A | | 12/1999 | Lange et al. | |
| 6,003,268 A | | 12/1999 | Oruganty | |
| 6,003,936 A | * | 12/1999 | Gordon | 296/218 |
| 6,036,256 A | * | 3/2000 | Hilliard et al. | 296/107.07 |
| 6,068,326 A | | 5/2000 | Shiromura | |
| 6,095,589 A | | 8/2000 | Kinnanen et al. | |
| 6,149,223 A | * | 11/2000 | Baessler et al. | 296/146.14 |
| 6,203,100 B1 | * | 3/2001 | Gordon | 296/218 |
| 6,216,394 B1 | | 4/2001 | Fenelon | |
| 6,247,732 B1 | | 6/2001 | Alton | |
| 6,290,281 B1 | | 9/2001 | Durrani et al. | |
| 6,364,379 B1 | | 4/2002 | Roberts et al. | |
| 6,431,635 B2 | | 8/2002 | Nicastri | |
| 6,588,824 B2 | * | 7/2003 | Neubrand | 296/99.1 |
| 2002/0014783 A1 | | 2/2002 | Nicastri | |

OTHER PUBLICATIONS

"Bestop", Dec. 1997, Rev. J.*
J.C.Whitney, "Replacement Spreader Bars", Nov. 2003.*
Photographs of 1993 Isuzu Amigo XS vehicle (believed to have been offered for sale prior to 2003).
Photographs of 2001 Isuzu Amigo Rodeo Sport vehicle (believed to have been offered for sale prior to 2003).
Photographs of 2003 Land Rover Freelander SE3 vehicle (believed to have been publically used or published on Nov. 8, 2002).

* cited by examiner

*Primary Examiner*—Jason Morrow
(74) *Attorney, Agent, or Firm*—Harness, Dickey & Pierce, P.L.C.

(57) ABSTRACT

A preferred embodiment of an automotive vehicle roof system includes a detachable convertible roof that covers a rear storage compartment and at least a portion of a passenger compartment of the vehicle. In another aspect of the present invention, the retracted convertible roof may be removed entirely from the vehicle by disengaging quick release attachment devices. Yet another aspect of the present invention provides the ability to operate the convertible roof independently of the vehicle's rear backlite. In a further aspect of the present invention, an adjustable tensioning device is employed.

64 Claims, 14 Drawing Sheets

AUTOMOTIVE VEHICLE ROOF SYSTEM HAVING A DETACHABLE CONVERTIBLE ROOF

BACKGROUND AND SUMMARY OF THE INVENTION

The present invention relates in general to automotive convertible roof systems, and more particularly, to an automotive vehicle roof system having a detachable convertible roof.

Automotive vehicles, such as sport utility vehicles (SUVs), have experienced a substantial increase in popularity in recent years. With the increase in popularity has come an increased demand for many of the amenities that were generally only found on other types automotive vehicles, such as convertible roof systems. Convertible roof systems designed for other automotive vehicles, such as passenger cars, are not, however, readily adaptable for use with SUVs because of the significant design differences between the two types of vehicles. For example, many SUVs have a rear storage compartment that is an extension of the passenger compartment, whereas in passenger cars the storage compartment is typically separate from the passenger compartment. Since it is generally desirable to be able to access the rear storage compartment from the rear of the vehicle, it would be advantageous that the convertible roof system be designed to allow for easy access to the rear storage compartment. SUVs also present a challenge as to how and where to store the convertible top when the top is fully retracted without unnecessarily using up valuable storage space.

Various convertible roof systems for use with SUVs have been recently developed that attempt to address these and other problems associated with adapting a convertible roof system for use with an SUV. Examples of previously designed SUV convertible roof systems are disclosed in U.S. Pat. No. 6,068,326, entitled "Support Structure For A Canvas Top Bow On A Canvas Top Automobile," which issued to Shiromura on Sep. 9, 1998; U.S. Pat. No. 5,775,767 entitled "Convertible Top For A Vehicle Having A Rear Egress," which issued to Harrison et al. on Aug. 15, 1996; and U.S. Pat. No. 5,299,850 entitled "Automobile With Canvas," which issued to Kaneko et al. on Aug. 27, 1992; the foregoing patents are incorporated by reference herein. While some of the patents have improved the art, a demand still exists to further simply the operation and improve the functionality of convertible roof systems for SUVs.

In accordance with the present invention, a preferred embodiment of an automotive vehicle roof system includes a detachable convertible roof that covers a rear storage compartment and at least a portion of a passenger compartment of the vehicle. A further aspect of the present invention provides a linkage mechanism that is movable from an extended position to a retracted position in order to provide unobstructed access to the vehicle's storage compartment from the rear of the vehicle. In another aspect of the present invention, the retracted convertible roof may be removed entirely from the vehicle by disengaging quick release attachment devices. Yet another aspect of the present invention provides the ability to operate the convertible roof independently of the vehicle's rear backlite. In a further aspect of the present invention, an adjustable tensioning device is employed.

The automotive vehicle roof system of the present invention is advantageous over previous designs in that the present invention provides a mechanism for retracting the convertible roof independent of the rear backlite. This allows for relatively unobstructed access to the rear storage compartment of the vehicle. Furthermore, not attaching the rear backlite to the convertible roof eliminates the need to retract or manually unsnap the convertible roof in order to access the vehicle's storage compartment from the rear of the vehicle. The present invention also provides a unique linkage mechanism that allows the convertible roof to be easily moved between its retracted and extended positions. If desired, the retracted convertible roof can be entirely removed from the vehicle with minimal effort by simply releasing the quick releasing latch and pin devices with common attachment points for both removable soft-top and removable hard-top convertible roofs; this attachment scheme also eliminates the typical loose fasteners that often get lost when the roof is detached. Moreover, an adjustable tensioning assembly causes roof bow-to-roof bow or roof bow-to-backlite frame spacing modifications which improve the fit and function of the pliable roof cover. Additional advantages and features of the present invention will become apparent from the following description and appended claims, taken in conjunction with the accompanying drawings.

DETAILED DESCRIPTION OF THE PREFERRED EMBODIMENT

Figure 1:
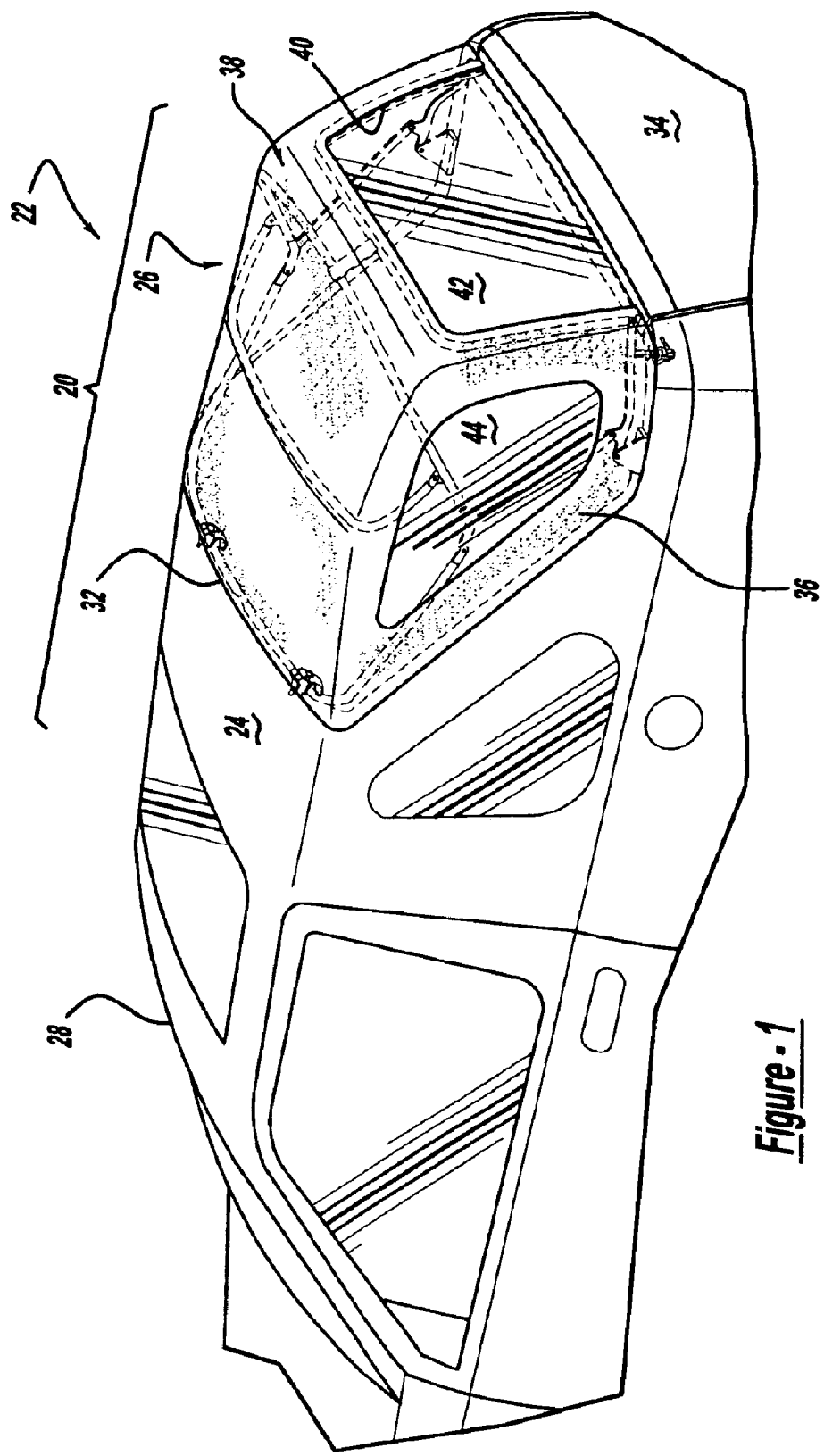
FIG. 1 is a fragmentary perspective view showing the preferred embodiment of an automotive vehicle roof system with the convertible roof in a fully raised and attached position.
Figure 2:
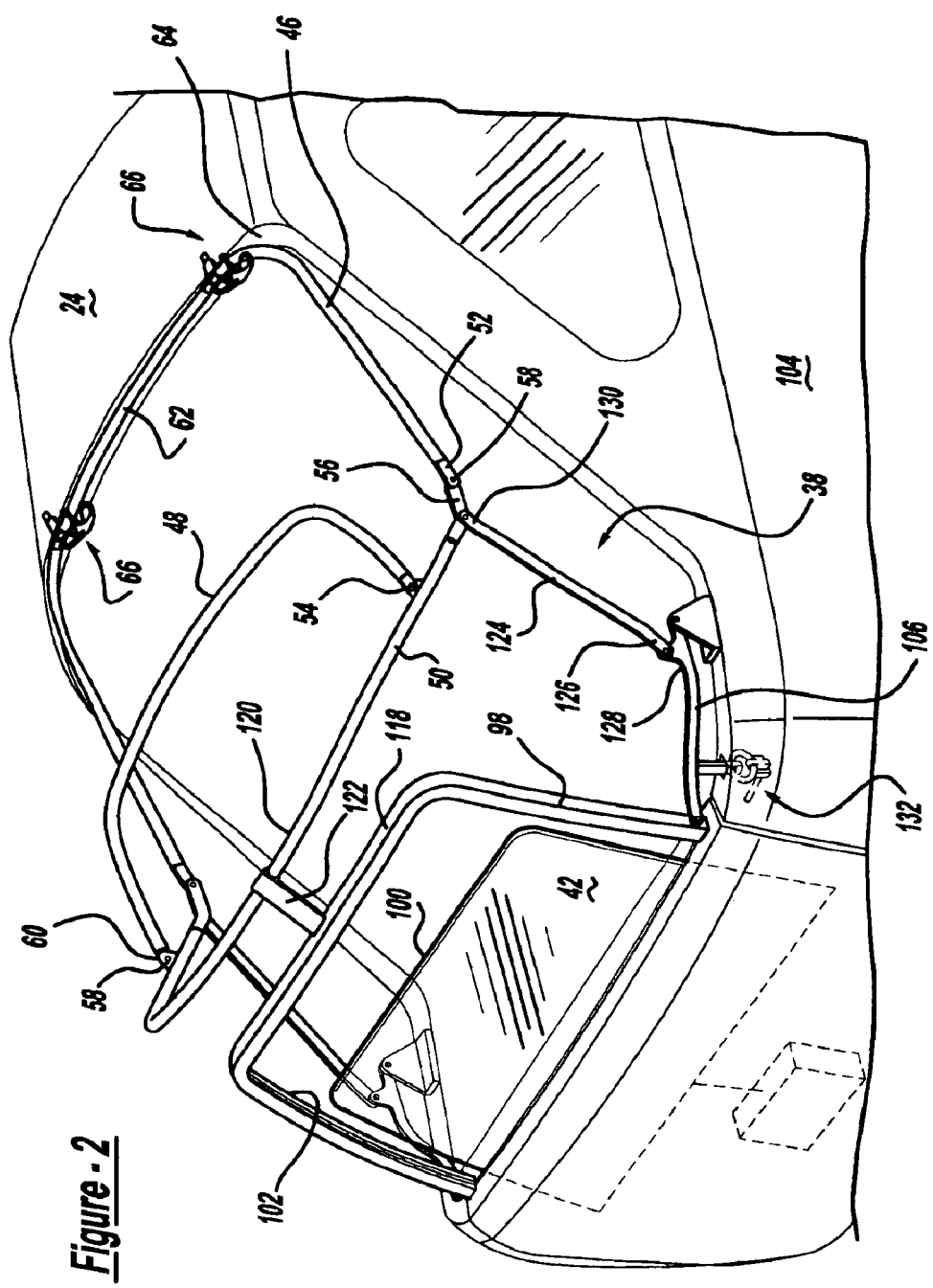
FIG. 2 is a perspective view, from an opposite side of the vehicle from FIG. 1, showing a convertible roof linkage mechanism employed in the preferred embodiment automotive vehicle roof system, disposed in the fully raised position.
Figure 3:
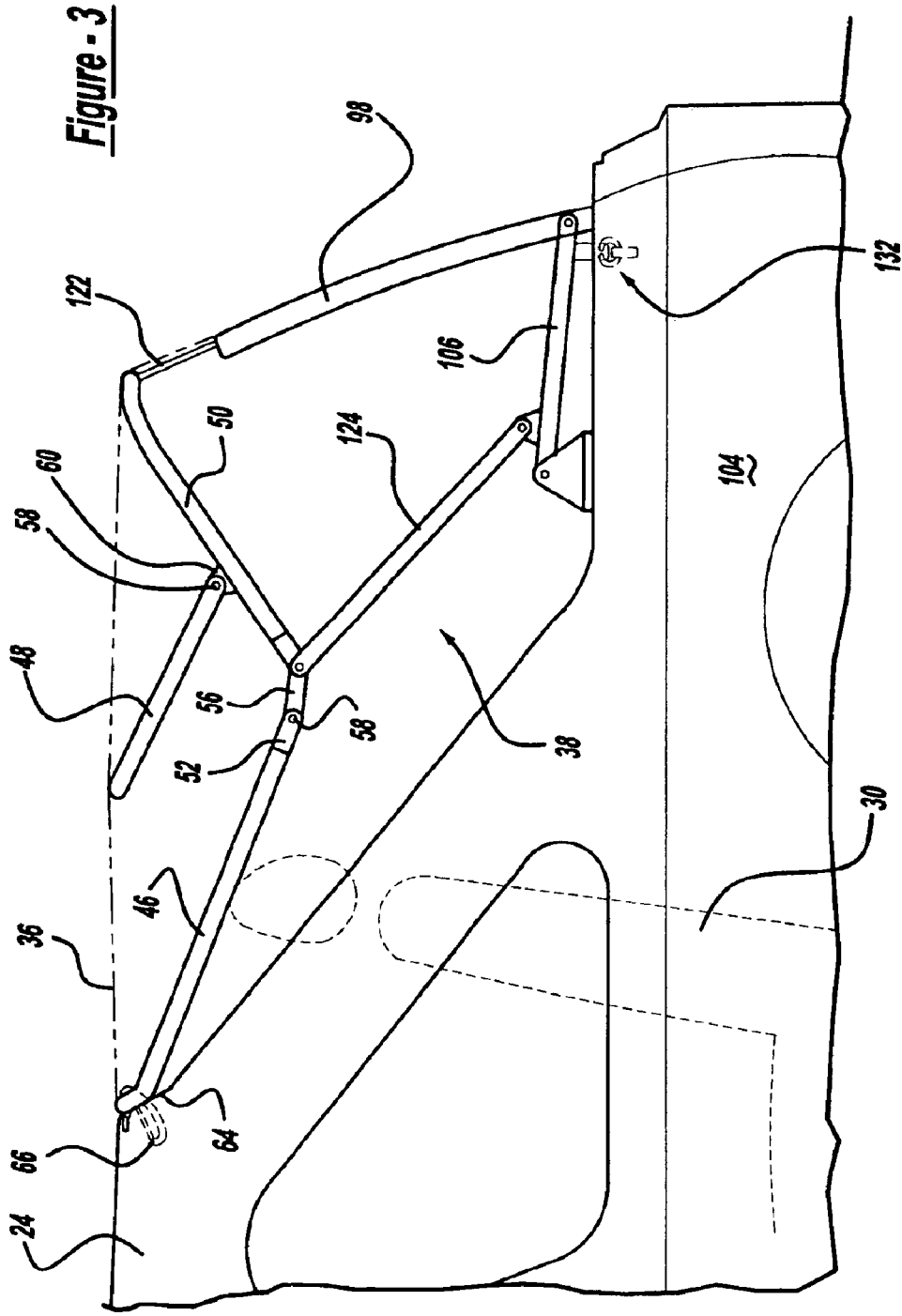
FIG. 3 is a side elevational view, from the same side of the vehicle as with FIG. 1, showing the convertible roof linkage mechanism employed in the preferred embodiment automotive roof system, disposed in the fully raised position.

FIGS. 1–3 show the preferred embodiment of a convertible roof system 20 employed in an automotive vehicle 22, such as a notch-back sport utility vehicle, or alternatively, a station wagon or van. Roof system 20 consists of a stationary, rigid roof panel 24 and a soft-top convertible roof 26. Stationary roof panel 24 is made from rigid sheet steel which extends from a front windshield header 28 back to a position approximately above a rear passenger seat 30 (see FIG. 3). Convertible roof 26 covers a rearmost portion of vehicle 22 and extends from a trailing edge 32 of stationary roof panel 24 back to a rear tailgate 34 of the vehicle. Tailgate 34 can be manually, downwardly pivoted to a horizontal open position about a bottom cross vehicle pivot axis or may be rotated open about a vertical, side pivot axis. Convertible roof 26 includes a pliable cover 36 that is supported by a underlying top stack linkage mechanism 38. Cover 36 is preferably made from any of a variety of pliable or flexible materials, such as canvas or a multi-layer twill fabric.

Figure 8:
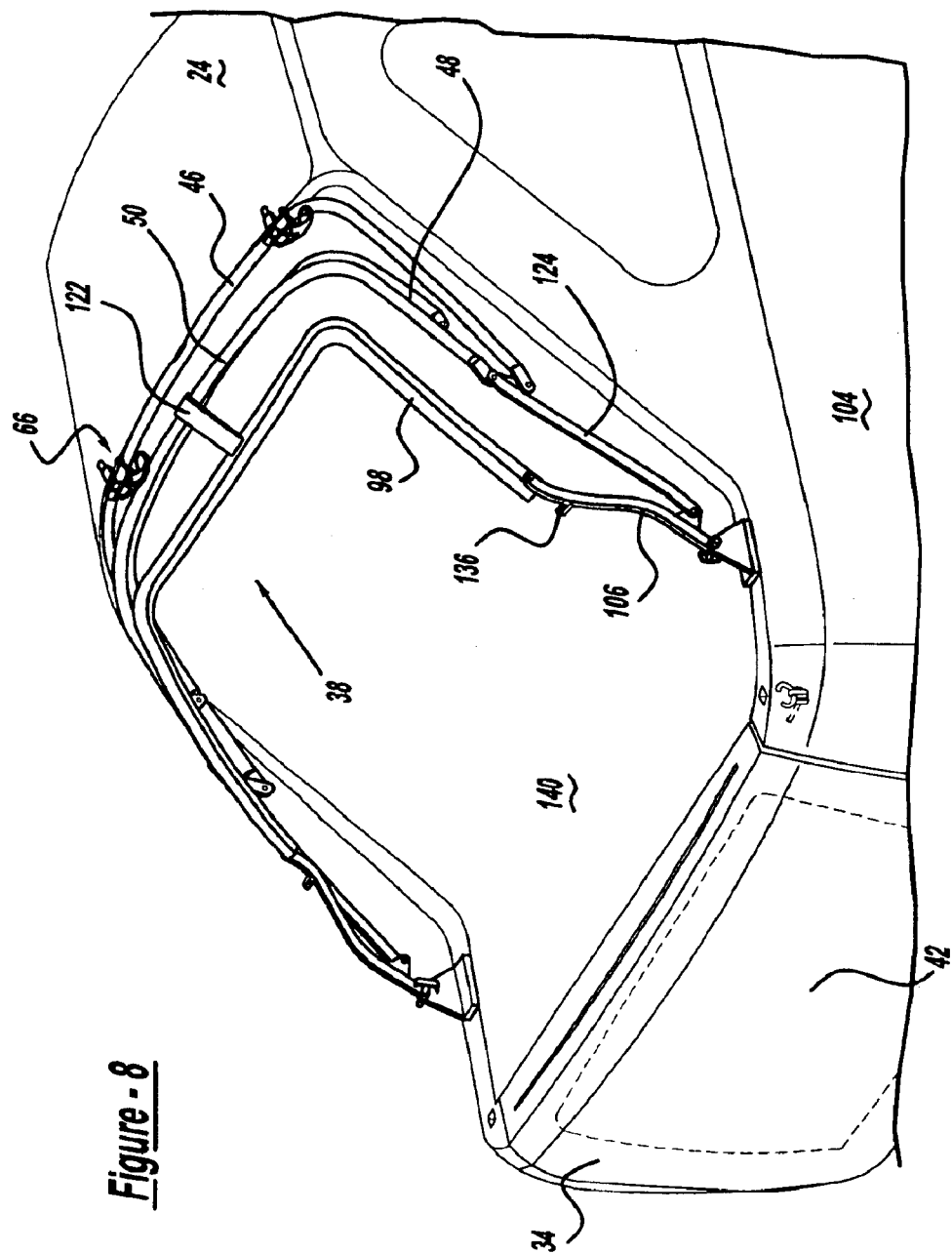
FIG. 8 is a perspective view, similar to FIG. 2, showing the convertible roof linkage mechanism employed in the preferred embodiment automotive roof system, disposed in the fully open position.

Convertible roof 26 has a U-shaped rear opening 40 that is adapted for receiving a rear backlite or back window 42. Backlite 42 is movable between an extended position, as shown in FIG. 1, and a retracted position, as shown in FIG. 8, wherein the backlite is concealed within rear tailgate 34. Backlite 42 may optionally include a frame, seals and attachment brackets. Convertible roof 26 further includes a pair of side windows 44 that are suitably affixed to openings in cover 36. Side windows 44 are preferably constructed from a generally transparent pliable material, such as vinyl or, alternately, a transparent rigid material such as glass. Side window 44 may be permanently attached to cover 36, but are preferably detachable using zippers, snaps or clips. If a rigid material is used for the side windows, however, it will be necessary for the windows to be removable in order to allow the convertible roof to be retracted.

Cover 36 is supported by a top stack or linkage mechanism 38, which is manually operable for moving convertible roof 26 between an extended and a retracted position. Linkage mechanism 38 employs three generally U-shaped roof bows, which include a forwardmost first roof bow 46, a second roof bow 48, and a rearmost third roof bow 50. Each of the three roof bows has a cylindrical cross-sectional shape, although other geometries may alternately be used with equally satisfactory results. The three roof bows may have either solid or hollow cores, but will preferably utilize hollow cores to maximize the strength to weight ratio of the roof bows. Roof bows 46, 48 and 50 each have a pair of ends, 52, 54, and 56, respectively. Ends 52, 54, and 56 have a generally rectangular cross-sectional shape, which facilitate attachment of the roof bows while also providing a more stable connection. Roof bows 46, 48 and 50 are preferably constructed of a metal material, such as aluminum or steel, but may also be made from other materials, including engineering grade polymers and composite materials containing fiberglass or carbon fibers. Roof bows constructed of polymeric or composite materials may also incorporate metallic ends that are suitably attached to the non-metallic portion of the roof bow.

Referring to FIGS. 2 and 3, end 52 of first roof bow 46 is pivotally attached to end 56 of third roof bow 50 using a pivot attachment 58, which may consist of a bolt, rivet, screw, or other suitable fixture device. Second roof bow 48 is pivotally attached to third roof bow 50 by connecting end 54 to a standoff 60 that is fixedly attached to third roof bow 50 using a pivot attachment 58.

First roof bow 46 has an intermediate section 62 that is oriented in a generally horizontal and cross vehicle direction when convertible roof 26 is attached to vehicle 22 in its raised position. Intermediate section 62 is positioned adjacent to a trailing edge 64 of stationary roof panel 24. First roof bow 46 is secured to trailing edge 64 by a pair of latches 66, which are shown in more detail in FIG. 4.

Each latch 66 includes a cylindrically shaped body 68 that encircles an adjacent peripheral majority of intermediate section 62 of first roof bow 46. Latch body 68 has an interior diameter that is preferably slightly larger than an outside diameter of intermediate section 62 of the first roof bow, which will permit latch 66 to freely rotate about its connection to the first roof bow. Latch body 68 contains an elongated opening 70 that runs parallel to a longitudinal axis of latch body 68 to facilitate assembly of the latch to first roof bow 46. Latch body 68 is preferably made from a resilient material, such as an engineering grade polymer, that will permit flexing of the latch body during assembly. Latch 66 is assembled to first roof bow 46 by flexing latch body 68 so that the distance between edges 72 and 70 is greater than the diameter of intermediate section 62 of first roof bow 46. This allows latch body 68 to be snapped over the first roof bow. Once attached to the first roof bow, latch body 68 is allowed to return to its non-flexed condition, thereby securing latch 66 to first roof bow 46.

Axial movement of latch 66 along a longitudinal length of intermediate section 62 of first roof bow 46 is prevented by a locating pin 76 that is affixed to an outer surface of first roof bow 46. Locating pin 76 protrudes through an elongated slot 78 located in latch body 68. Slot 78 has a width that is only slightly larger than an outside diameter of locating pin 76 in order to minimize axial movement of latch 66 along the length of first roof bow 46. Slot 78 has a circumferentially elongated length that allows intermediate section 62 of first roof bow 46 to rotate within latch body 68, in a lost motion manner, along a fore-aft plane of the vehicle when convertible roof 26 is moved between its extended and retracted positions.

Each latch 66 further employs a stepped positioning pin 80 that engages a recess (not shown) located in trailing edge 64 of stationary roof panel 24. A reduced diameter lead-in segment 82 projects from an enlarged segment 84 of positioning pin 80. The smaller diameter of lead-in segment 82 assists in orienting and aligning enlarged segment 84 within the recess in stationary roof panel 24 when attaching convertible roof 26 to the vehicle. Moreover, positioning pin 80 has a tapered distal end. A tapered outside diameter of enlarged segment 84 produces a slight press fit between positioning pin 80 and the recess in trailing edge 64 when convertible roof 26 is attached to the vehicle. Additionally, a handle 88 is pivotally attached to a boss 90 that extends from latch body 68 by a pivot rod.

Latch 66 employs a connecting member 94 which couples a hook 96 to handle 88. Hook 96 engages a second recess (not shown) or striker pin located on an underside surface of stationary roof panel 24. Latch 66 is engaged by manually pivoting handle 88 up toward the underside of the stationary roof panel 24. This causes hook 96 to retract toward the handle, thereby pulling intermediate section 62 of first roof bow 46 toward trailing edge 64 of stationary roof panel 24. Disengagement or unlatching is achieved by reverse handle rotation. Alternately, other latches may be employed such as that disclosed in U.S. Pat. No. 5,299,850 entitled "Automobile With Canvas," which issued to Kaneko et al. on Apr. 5, 1994; and U.S. Pat. No. 4,817,999 entitled "Convertible Header Latch Mechanism," which issued to Drew on Apr. 4, 1989; the foregoing patents are incorporated by reference herein.

Referring to FIGS. 1, 2, and 8, backlite 42 is movable between the open position (as shown in FIG. 1) and the closed position (as shown in FIG. 8). When fully retracted or open, backlite 42 is hidden from view within tailgate 34. Backlite 42 may be either manually or automatically actuated using a variety of electrically driven window lift mechanisms 97, such as that disclosed within U.S. Pat. No. 5,337,579 entitled "Vehicle Window Regulating Device," which issued to Bergesio on Aug. 16, 1994, and U.S. Pat. No. 4,170,847 entitled "Tailgate Window Regulator," which issued to Pickles on Oct. 16, 1979; both of which are incorporated by reference herein. Convertible roof 26 includes a backlite frame 98 that surrounds outer peripheral top and side edges 100 of backlite 42 when the backlite is in its fully extended or closed position, as shown in FIG. 1. Backlite frame 98 contains an elastomeric pocket seal 102 that is suitably attached to an inside periphery of backlite frame 98. With backlite 42 positioned in its fully extended position, outer peripheral edges 100 of backlite 42 contacts pocket seal 102 to produce a weatherproof seal between backlight frame 98 and backlite 42. Backlite 42 is preferably a rigid glass panel.

Figure 5:
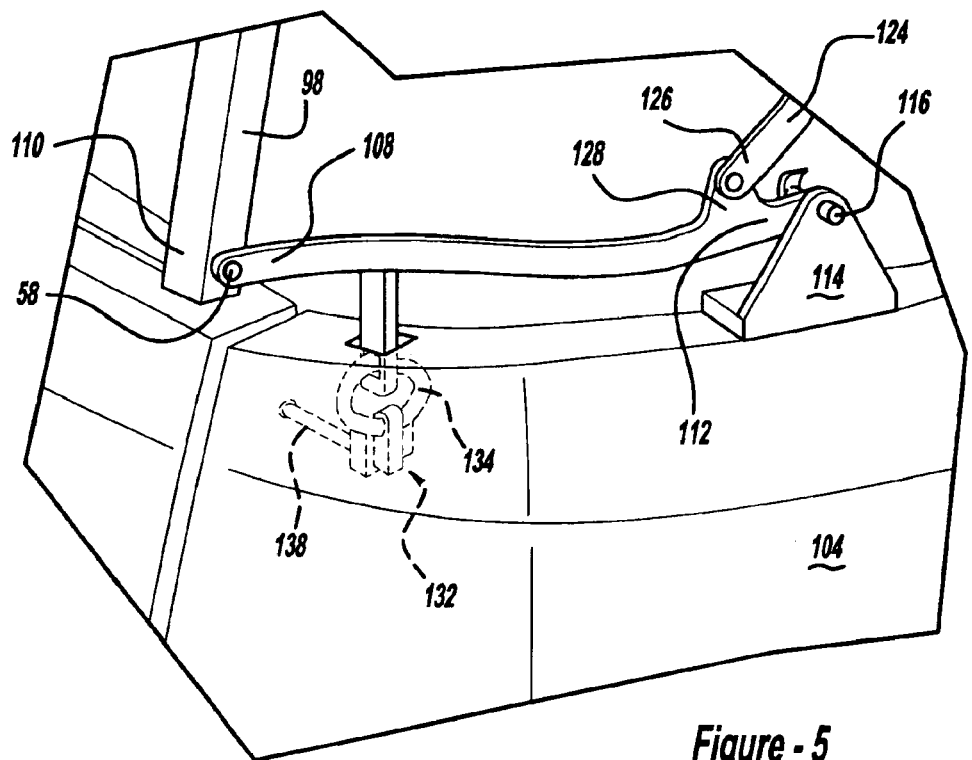
FIG. 5 is an enlarged, perspective view, similar to FIG. 2, showing a drive link and a latching mechanism employed in the preferred embodiment automotive roof system.

As shown in FIG. 5, backlite frame 98 is attached to a body 104 of vehicle 22 by a pair of base links 106. An end 108 of each base link 106 is pivotally attached to an end 110 of backlite frame 98. Another end 112 of base link 106 is pivotally attached to a bracket 114 using a quick release, cylindrical pivot pin 116 with a transversely oriented, spring loaded detent ball to maintain the pin's engaged position against minor forces and vehicle vibration. Pin 116 is tethered to the convertible roof by a cable or the like. Each bracket 114 is fixedly attached to a side panel of vehicle body 104.

Referring to FIG. 2, rear backlite frame 98 has an intermediate section 118 that is oriented in a generally horizontal and cross vehicle direction. Third roof bow 50 has a similarly orientated intermediate section 120. A pair of upper backlite links 122 connect intermediate section 118 of backlite frame 98 to intermediate section 120 of third roof bow 50. Upper backlite links 122 are pivotally connected to roof bow 50. The connection between upper backlite links 122 and backlite frame 98 is preferably rigid, but may also be of a pivoting type. Upper backlite links are preferably constructed in accordance with co-pending U.S. Serial No. 60/409,321 entitled "Convertible Backlite Control System" which was invented by the present inventor, filed on Sep. 10, 2002, and is incorporated by reference herein.

A pair of control links 124 connect base links 106 to third roof bow 50. An end 126 of each control link 124 is pivotally connected to a standoff 128 on base link 106. Standoff 128 is positioned between ends 108 and 112 of base link 106. An opposite end 130 of control link 124 is pivotally attached to an elbow of third roof bow 50 adjacent offset angled end 56. The pivot connection of end 130 of control link 124 is spaced from the pivot connection coupling first roof bow 46 to third roof bow 50.

A pair of quick connect, rear latching mechanisms 132 are used to secure convertible roof 26 to rear portions of the side body panels. A rear latching mechanism can be constructed like those disclosed in U.S. Pat. No. 6,364,379 entitled "Vehicle Compartment Latch," which issued to Roberts et al. on Apr. 2, 2002; U.S. Pat. No. 6,247,732 entitled "Vehicle Compartment Latch," which issued to Alton on Jun. 19, 2001; U.S. Pat. No. 4,979,384 entitled "Trunk Lid Lock with Remote Release" which issued to Malesko et al. on Dec. 25, 1990; and U.S. Pat. No. 4,971,370 entitled "Self-Releasing Deck Lid Latch" which issued to Detweiler et al. on Nov. 20, 1990; the foregoing patents are incorporated by reference herein. Referring to FIG. 5, each rear latching mechanism 132 includes a releasable catch 134 that engages a striker 136 that downwardly extends from base link 106. Rear latching mechanism 132 includes a release button or remotely actuable cable 138 that is accessible from an interior of vehicle 22. Depressing release button 138 causes catch 134 to disengage from hook 136, which allows convertible roof 26 to be cycled to its upwardly retracted or removed positions.

Figure 6:
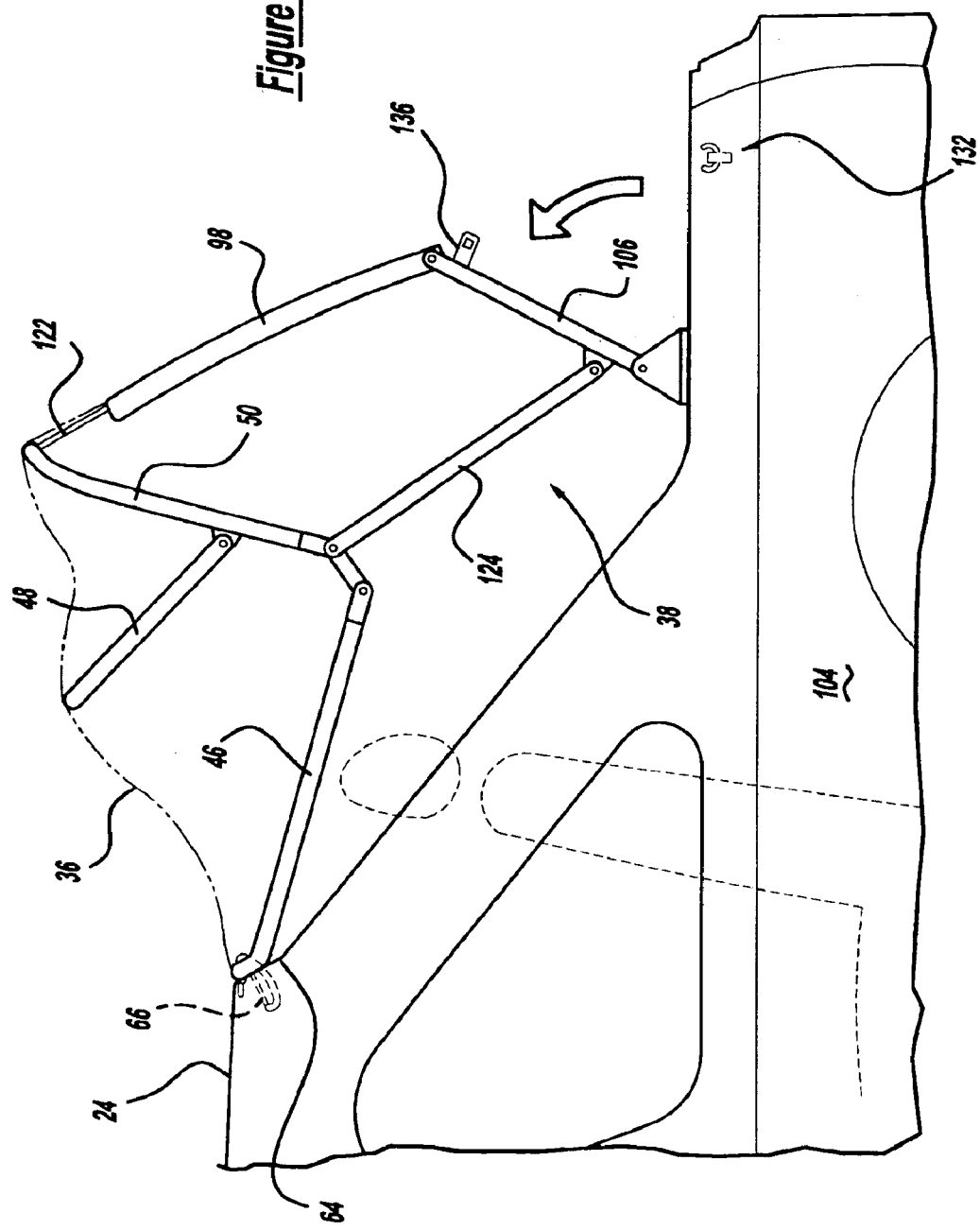
FIG. 6 is a side elevational view, similar to FIG. 3, showing the convertible roof linkage mechanism employed in the preferred embodiment automotive roof system, disposed in a partially open position.
Figure 7:
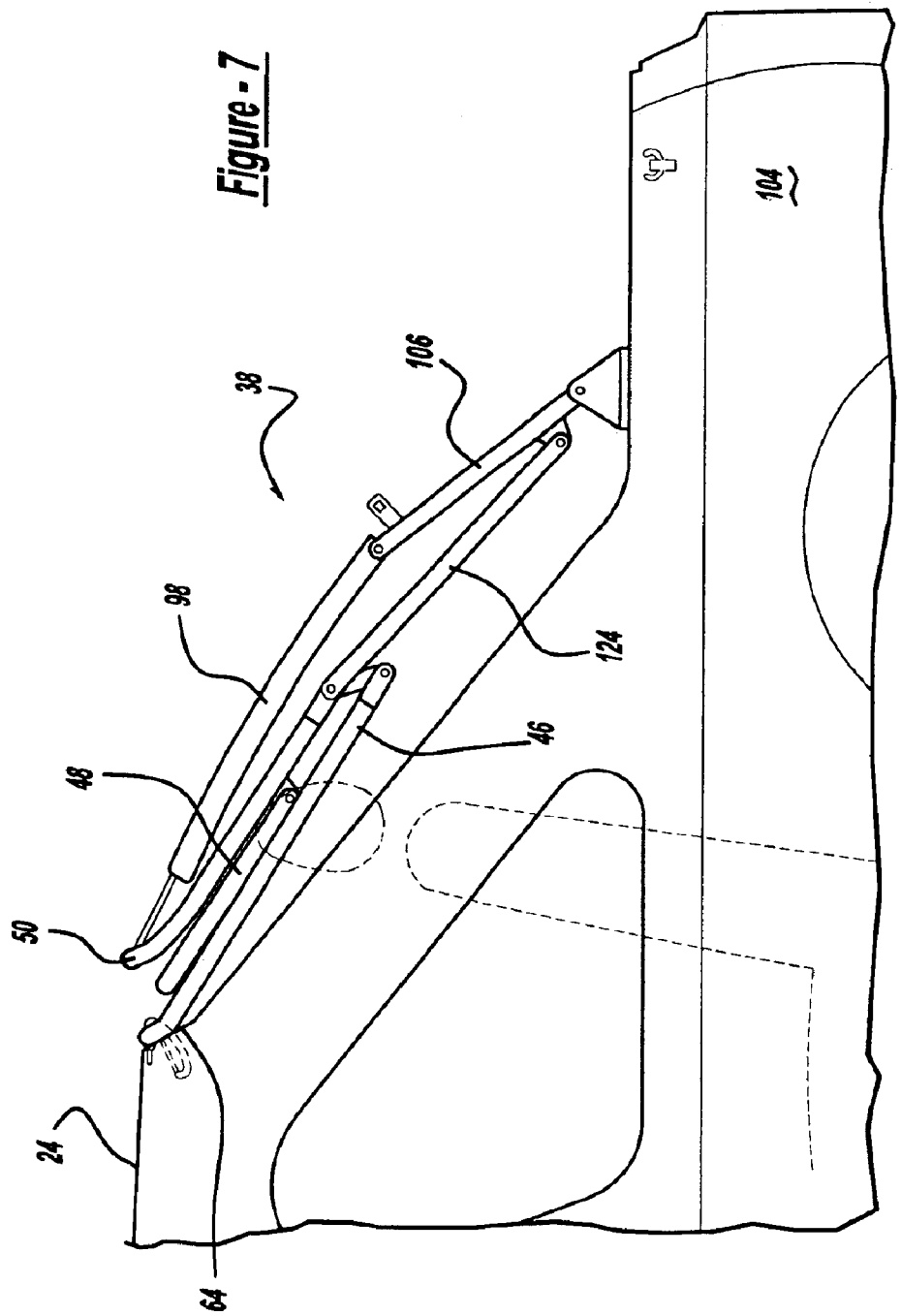
FIG. 7 is a side elevational view, similar to FIG. 3, showing the convertible roof linkage mechanism employed in the preferred embodiment automotive roof system, disposed in a fully open position.
Figure 11:
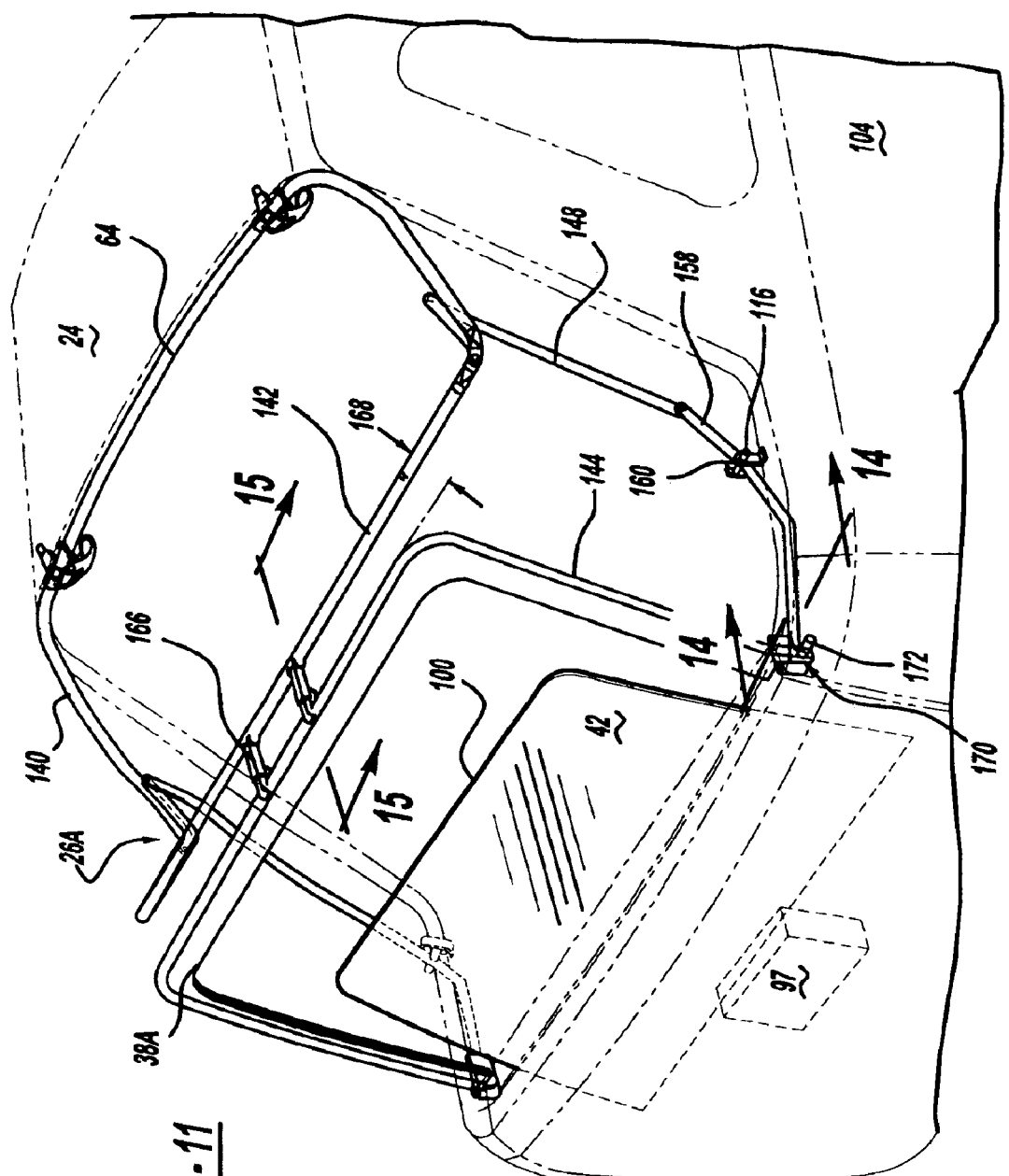
FIG. 11 is a perspective view, similar to FIG. 2, showing the alternate embodiment automotive vehicle roof system, disposed in the fully raised position.

To upwardly retract or collapse convertible roof 26, rear backlite 42 is automatically moved to its retracted position as shown in FIG. 8 using electric motor driven window lift mechanism 97 (see FIG. 11). Rear latching mechanisms 132 are then released by manually depressing latch button 138, which is accessible from inside the vehicle storage compartment. An operator subsequently manually rotates base link 106 about its connection to bracket 114 upwardly and toward the front of the vehicle as shown in FIG. 6. Continued movement of base link 106 causes third roof bow 50 to rotate about its connection with first roof bow 46 toward the front of the vehicle, and second roof bow 48 to rotate about its connection with third roof bow 50 toward the rear of the vehicle. With convertible roof 26 in its fully upwardly retracted position, as shown in FIGS. 7 and 8, first roof bow 46, second roof bow 48, and third roof bow 50 are placed in a nested position with the second roof bow being positioned adjacent to and between the first and third roof bows. Backlite frame 98 is thereby positioned adjacent to third roof bow 50. As can be observed in FIG. 8, moving convertible roof 26 to its upwardly retracted position permits relatively unobstructed and clear rear access to the rear cargo space 140 of the vehicle while also giving the vehicle a more open and sporty appearance. A strap with snaps or buckles can be employed to maintain the convertible roof in its upwardly retracted position.

Figure 9:
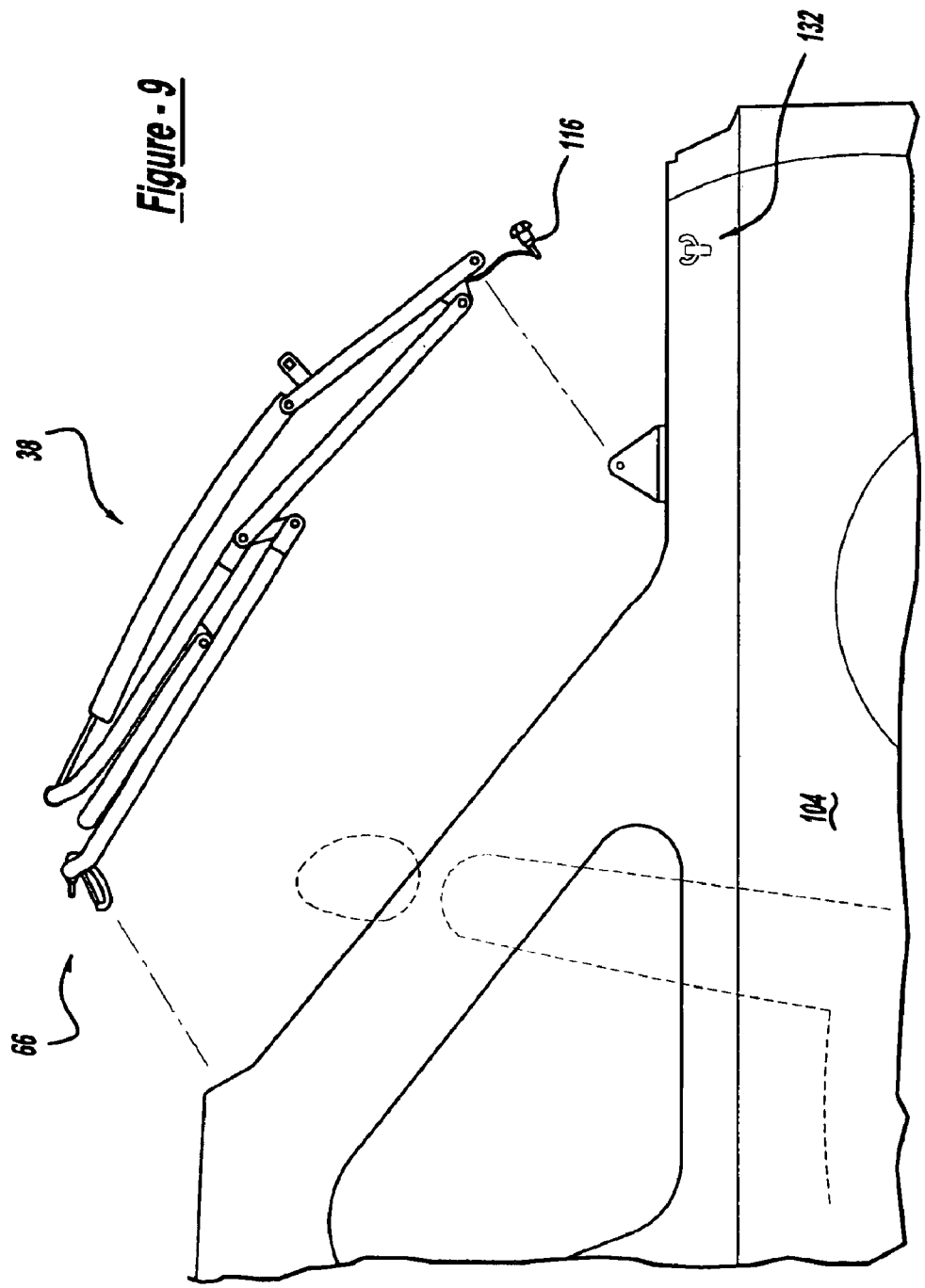
FIG. 9 is a side elevational view, similar to FIG. 3, showing the convertible roof linkage mechanism employed in the preferred embodiment automotive roof system, collapsed and removed from the vehicle.
Figure 10:
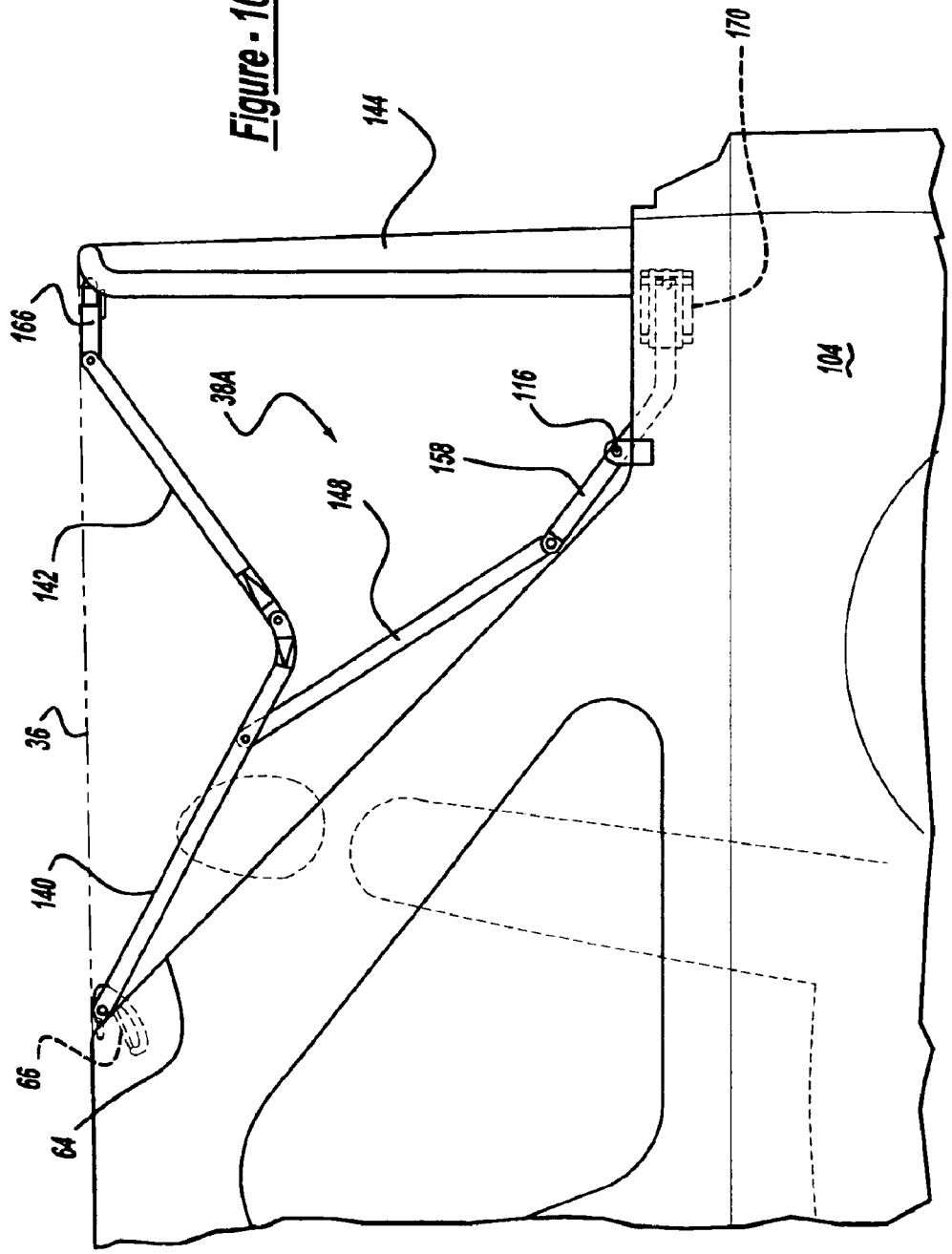
FIG. 10 is a side elevational view, similar to FIG. 3, showing an alternate embodiment automotive roof system, disposed in a fully raised position.

Once in its upwardly retracted position, convertible roof 26 is designed to be quickly and easily detached from the vehicle as shown in FIG. 9. This is accomplished by manually releasing latches 66 used to retain first roof bow 46 to trailing edge 64 of stationary roof panel 24. Quick release pins 116, used to attach base links 106 to brackets 114, are then disengaged. Convertible roof 26 can now be completely and easily removed from the vehicle without any loose parts.

Convertible roof 26 can be easily reattached to vehicle 22 by first aligning positioning pin 80 of each latch 66 with the corresponding recess located in trailing edge 64 of stationary roof panel 24. Hook 96 of latch 66 is then engaged with the corresponding recess located in the underside surface of stationary roof panel 24. Handle 88 is subsequently fully pivoted to its over-center locked position, thereby securing first roof bow 46 to stationary roof panel 24. End 112 of each base link 106 is next aligned with bracket 114 and quick release pins 116 are engaged to re-establish the pivot connection. Convertible roof 26 is then manually moved to its fully extended position. Finally, convertible roof 26 is secured in its fully extended position by applying a downward force to each base link 106 so as to engage hook 136 with catch 134 of rear latch 132. Backlite 42 may now be cycled to its fully extended position if desired.

FIGS. 10–16 show an alternate configuration 38A of the convertible roof top stack linkage mechanism of the present invention. Alternate convertible roof linkage mechanism 38A includes a first roof bow 140, a second roof bow 142 and a backlite frame 144. First roof bow 140 has a pair of ends 146 (best shown in FIG. 12) that are pivotally attached to second roof bow 142. A control link 148 has an end 150 pivotally attached to an end 152 of second roof bow 142. Another end 154 of control link 148 is pivotally attached to an end 156 of a base link 158. Base link 158 is pivotally attached to a bracket 160 by a quick release pin 116 and bracket 160 which is fixedly attached to vehicle body 104. An opposite end 162 of base link 158 is pivotally attached to an end 164 of backlite frame 144.

Figure 15:
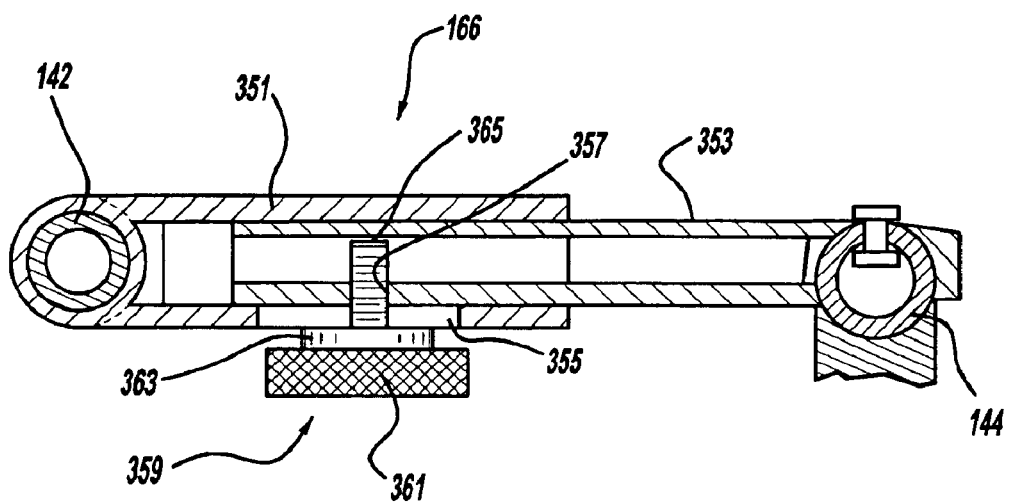
FIG. 15 is a cross-sectional view, taken along line 15—15 of FIG. 11, showing the alternate embodiment of an automotive roof system.

Furthermore, referring to FIGS. 11 and 15, backlite frame 144 is connected to second roof bow 142 by two tension-adjusting links 166. Each tension-adjusting link 166 includes an outer shaft 351 coupled to second roof bow 142, within which slides an inner shaft 353 coupled to backlite frame 144. A fore-and-after elongated slot 355 disposed in a bottom of outer shaft 351 is aligned with a threaded hole 357 disposed in inner shaft 353. A thumbscrew 359 has a manually rotatable knob 361, an enlarged diameter bearing member 363 and a threaded dowel 365. Dowel 365 engages hole 357 and allows sliding movement within slot 355 when loose such that the shafts can be manually, linearly expanded or retracted relative to each other. Thumbscrew 359 is then fully tightened to secure the shafts when in their desired positions. Thus, tension-adjusting links 166 allow an operator to vary the tautness of cover 36 when convertible roof 26A is fully extended by controlling a distance 168 between second roof bow 142 and backlite frame 144. This overcomes water leaks or wind noise caused by some traditional loose fitting roof covers, especially when the pliable cover may loosen over time due to the weight of snow or the like. Alternately, one or more tension-adjusting links 166 can be employed between any adjacent pair of roof bows.

Figure 4:
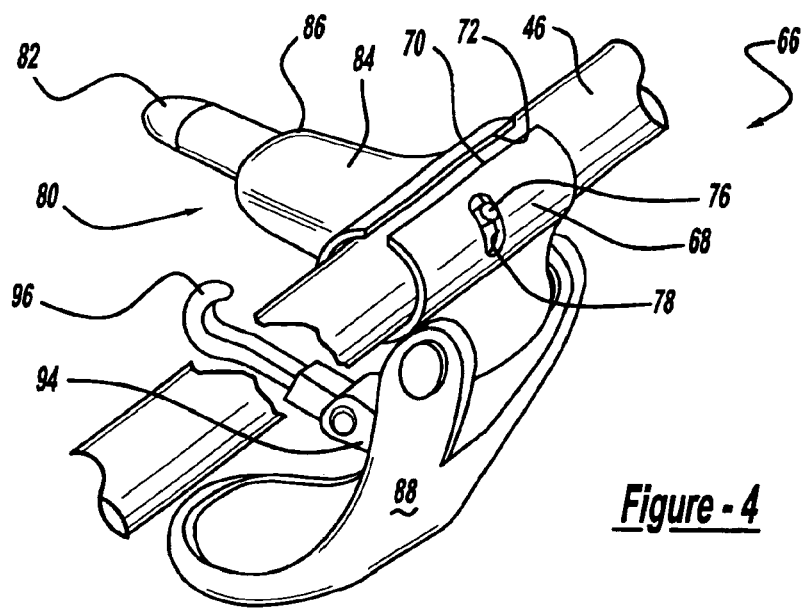
FIG. 4 is an enlarged, perspective view showing a latch employed in the preferred embodiment automotive roof system for attaching the convertible roof to a trailing edge of a stationary roof panel.
Figure 14:
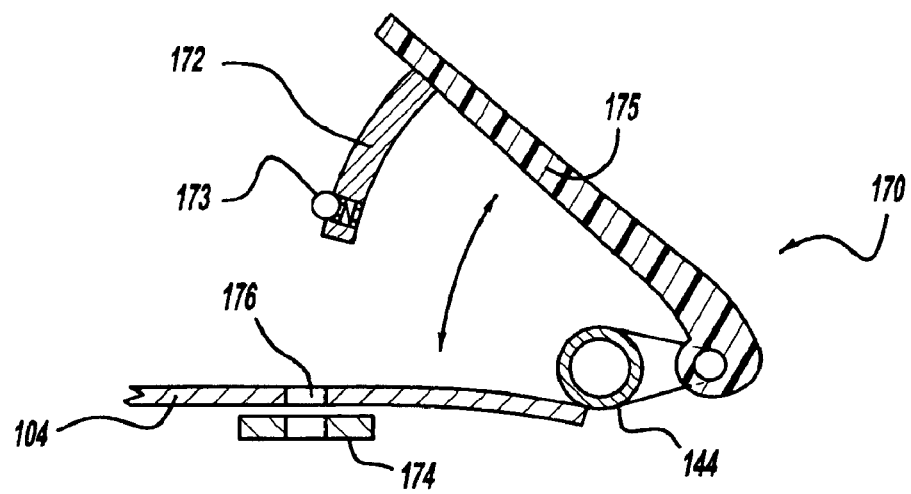
FIG. 14 is a cross-sectional view, taken along line 14—14 of FIG. 11, showing the alternate embodiment of an automotive roof system.

First roof bow 140 is secured to trailing edge 64 of stationary roof panel 24 using front latch 66 (see FIG. 4). Convertible roof 26 employs rear latches 170 to retain the rear portion of convertible roof 26A in its fully extended position. Referring now to FIGS. 11 and 14, each rear latch 170 incorporates a locking pin 172, having a transversely oriented, detented and spring loaded ball 173, that detachably connects an offset lower flange 174 of backlite frame 144 within an adjacent vehicle body panel 104. Thus, rotation of a handle 175 about a vertical pivot axis causes rear latch 172 to release the rear portion of the top stack mechanism from the vehicle body.

Figure 12:
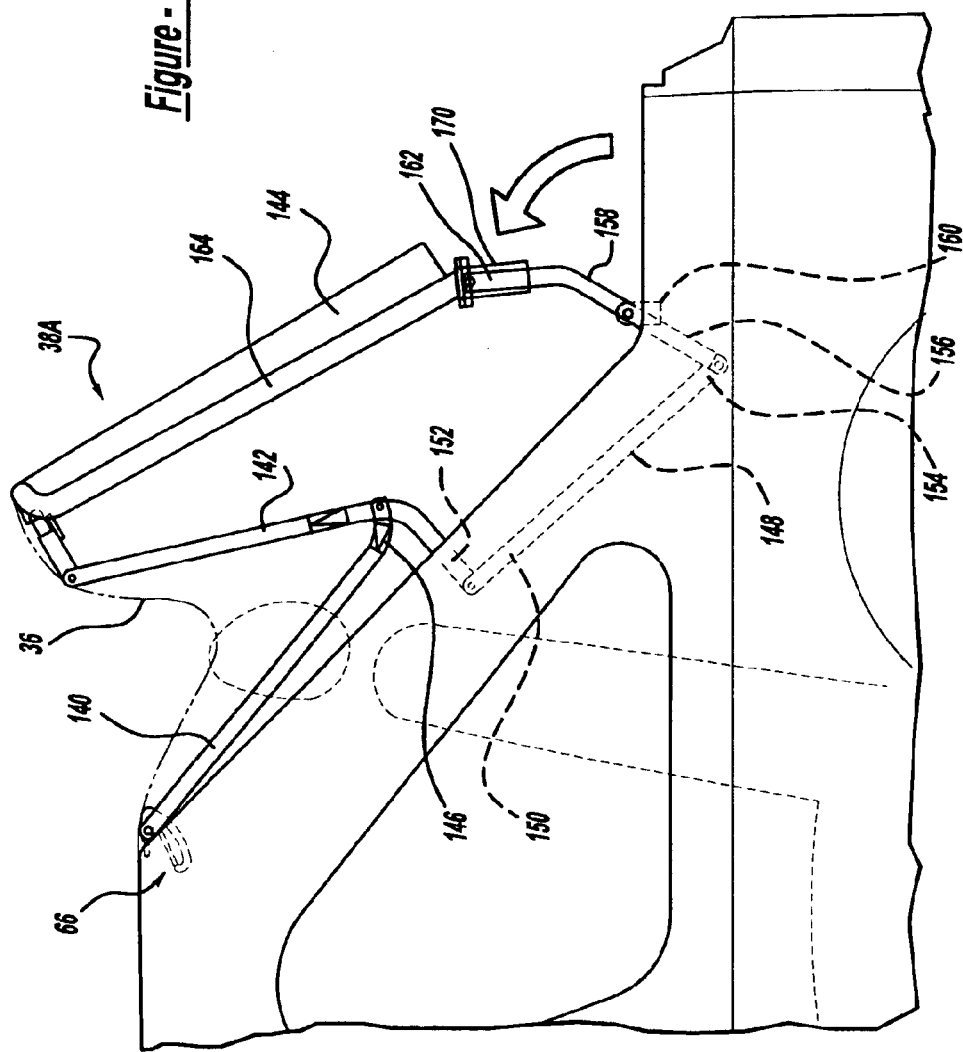
FIG. 12 is a side elevational view, similar to FIG. 3, showing the alternate embodiment automotive roof system, disposed in a partially open position.
Figure 13:
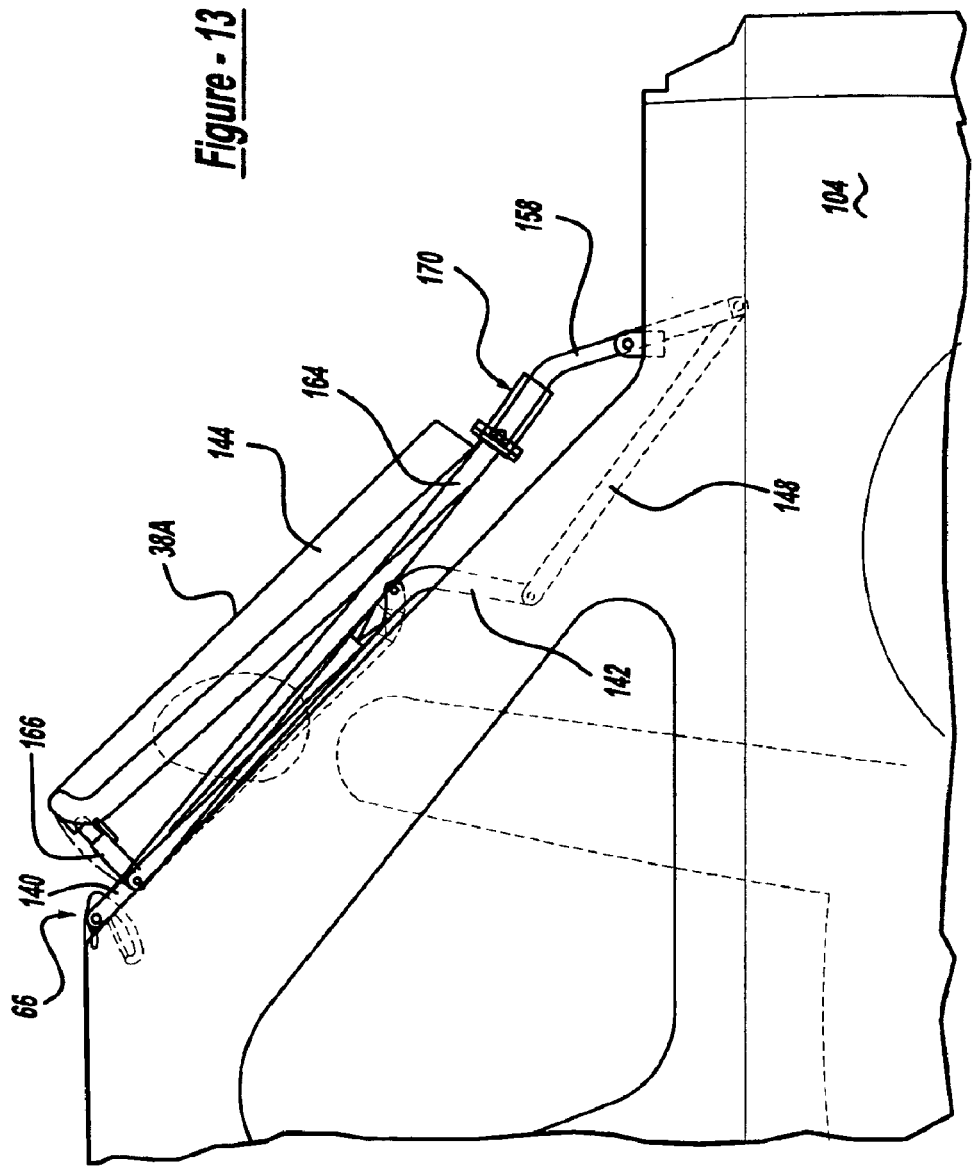
FIG. 13 is a side elevational view, similar to FIG. 3, showing the alternate embodiment automotive roof system, disposed in a fully open position.

Operating linkage mechanism 38A involves steps similar to those used to operate linkage mechanism 38. First, backlite 42 is retracted to its fully open position. Rear latch 170 is then actuated to disengage latch pin 172 from the hole 176 or recess located in vehicle body 104. End 162 of base link 158 is then rotated upwards and toward the front of the vehicle as shown in FIG. 12. FIG. 13 shows convertible roof 26 in its fully upwardly retracted position. Convertible roof 26 is subsequently removed from vehicle 22 by unlatching front latches 66 and disengaging quick release pins 116 that connect base link 158 to bracket 160. Convertible roof 26A may thereafter be removed from the vehicle.

Figure 16:
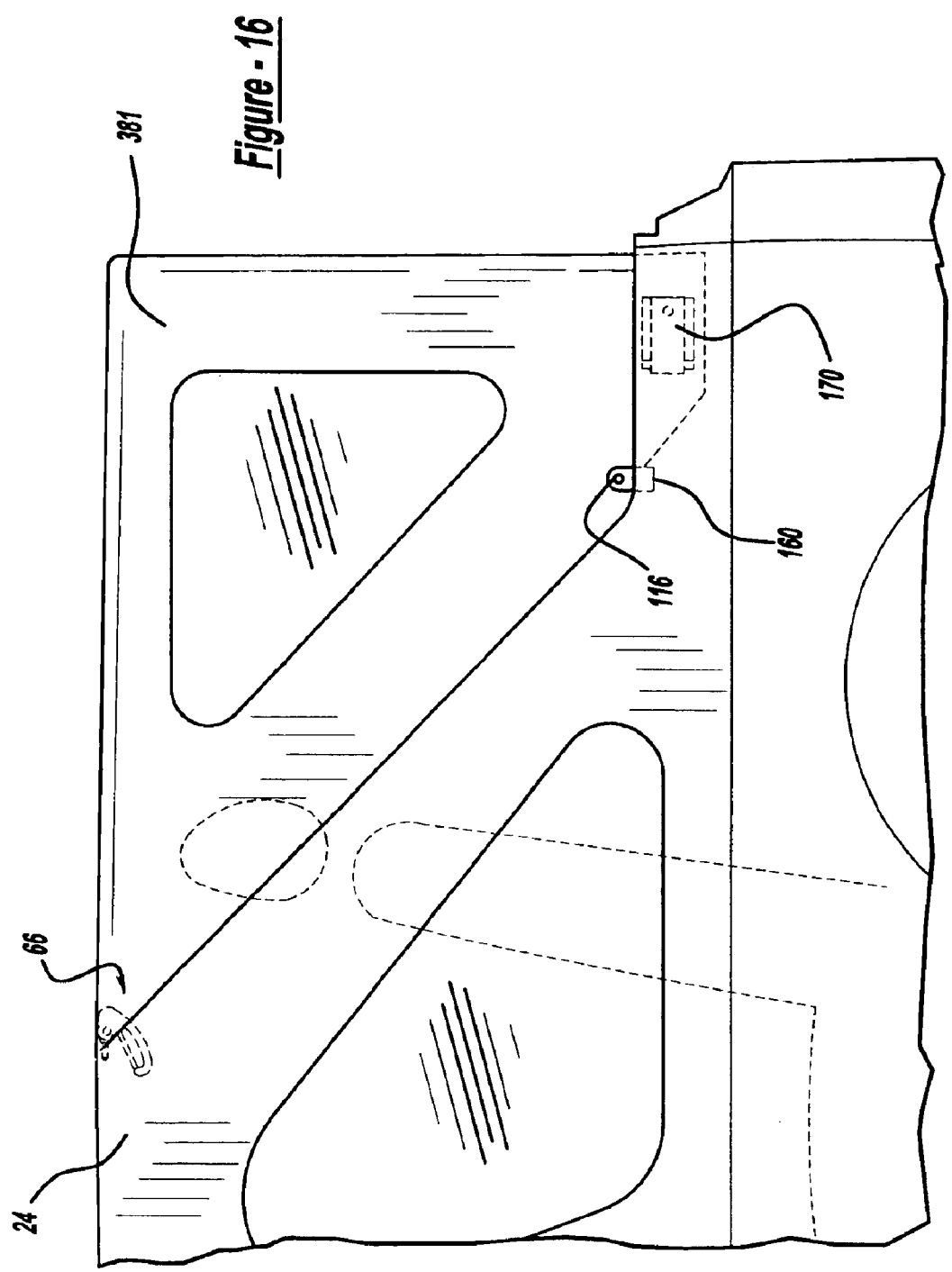
FIG. 16 is a side elevation view showing the preferred embodiment automotive roof system employing a hard top convertible roof.

A removable hard-top convertible roof 381, illustrated in FIG. 16, can thereafter be attached to the vehicle by employing identically common attachment devices. In other words, first pin 82 (see FIGS. 4 and 16) of latch 66 is inserted into the corresponding recesses in trailing edge 64 of stationary roof panel 24. The front convertible roof structure is secured to stationary roof panel 24 by engaging latch hook 96 with the recess located in the underside surface of stationary roof panel 24 and pivoting latch handle 88 towards the inside surface of stationary roof panel 24. Moreover, quick release pins 116 are reengaged to establish a connection between a middle of convertible roof 381 and bracket 160. Rear latches 170 are then rotated to connect a lower rear portion of convertible roof 381 with the vehicle body. Rear backlite 42 may thereafter moved between its open and closed positions if desired.

While various aspects of the convertible roof system have been disclosed, it will be appreciated that many other variations may be incorporated without departing from the scope of the present invention. For example, alternate latching mechanisms and/or pins may be used to secure the first roof bow to the trailing edge of the stationary roof panel. Likewise, alternate latches and/or pins may be employed to retain the middle and rear portions of the convertible roof. Additionally, although the top stack linkage mechanism is disclosed as being manually operable, the top stack may also be automatically actuated using hydraulic or electric motor driven actuation mechanisms. Furthermore, various materials and linkages have been disclosed in an exemplary fashion, but other materials and linkages may of course be employed, although some of the advantages of the present invention may not be realized. It is intended by the following claims to cover these and any other departures from the disclosed embodiments which fall within the true spirit of the invention.

What is claimed is:

1. An automotive vehicle roof system comprising:
   a soft-top convertible roof having a linkage assembly supporting a pliable roof cover, the linkage assembly being pivotable;
   a back window movable from a raised position to an open position even if the convertible roof remains stationary; and
   a back window frame coupled to the linkage assembly, the back window frame being movable mechanically independent of the back window;
   the convertible roof and the back window frame being removable from the vehicle.

2. An automotive vehicle roof system comprising:
   a soft-top convertible roof having a linkage assembly supporting a pliable roof cover;
   a back window movable from a raised position to an open position even if the convertible roof remains stationary;
   a back window frame coupled to the linkage assembly, the back window frame being movable mechanically independent of the back window;

the convertible roof and the back window frame being removable from the vehicle;

a first link pivotally attached to the vehicle at a first pivot; and a base link coupling the first link to the back window frame.

3. The roof system of claim 2 wherein the linkage assembly further comprises at least first and second roof bows pivotally coupled to the first link, and at least a section of each of the roof bows extending in a substantially cross vehicle direction.

4. The roof system of claim 1 further comprising:

a first roof bow;

a stationary roof panel substantially covering at least a front seating area;

the linkage assembly including a roof bow; and a front connector disengagably connecting the roof bow to the stationary roof panel.

5. The roof system of claim 4 further comprising a rear connector disengagably connecting the convertible roof to the vehicle.

6. An automotive vehicle roof system comprising:

a soft-top convertible roof having a linkage assembly supporting a pliable roof cover, the linkage assembly being pivotable, the linkage assembly including a roof bow;

a back window movable from a raised position to an open position even if the convertible roof remains stationary;

a back window frame coupled to the linkage assembly, the back window frame being movable mechanically independent of the back window;

the convertible roof and the back window frame being removable from the vehicle;

a first roof bow;

a front roof section substantially covering at least a front seating area;

a front connector disengagably connecting the roof bow to the front roof section; and a central pair of connectors disengagably connecting the convertible roof to the vehicle, at least one of the connectors being a pivotable coupling of the linkage assembly to the vehicle.

7. The roof system of claim 1 further comprising multiple connectors disengagably connecting the convertible roof to the vehicle, all of the connectors being removably attachable to the roof to eliminate loose connector parts.

8. An automotive vehicle roof system comprising:

a soft-top convertible roof having a linkage assembly supporting a pliable roof cover;

a back window movable from a raised position to an open position even if the convertible roof remains stationary; and a back window frame coupled to the linkage assembly, the back window frame being movable mechanically independent of the back window, the convertible roof and the back window frame being removable from the vehicle;

wherein the back window frame is pivotably coupled to the vehicle and the convertible roof is movable from an open position to a closed position while attached to the vehicle.

9. An automotive vehicle roof system comprising:

a soft-top convertible roof having a linkage assembly supporting a pliable roof cover;

a back window movable from a raised position to an open position even if the convertible roof remains stationary; and a back window frame coupled to the linkage assembly, the back window frame being movable mechanically independent of the back window;

the convertible roof and the back window frame being removable from the vehicle;

a front latch;

the linkage assembly including a front roof bow, the front latch being rotatably mounted to the roof bow; and the convertible roof being forwardly retractable.

10. The roof system of claim 1 further comprising a movable tailgate, wherein the back window is rigid and automatically retractable into the tailgate.

11. The roof system of claim 1 further comprising a cover tensioner, wherein the linkage assembly includes a roof bow, the cover tensioner coupling the roof bow to the back window frame and being operably adjustable to vary the cover tension by moving the roof bow relative to the back window frame even if the convertible roof remains in its fully raised position.

12. The roof system of claim 1 wherein the convertible roof covers a storage compartment of the vehicle when in its raised position.

13. An automotive vehicle system comprising:

a convertible roof cover;

a forward most roof bow;

at least a second roof bow coupled to the forward most roof bow, the roof bows supporting the roof cover; and a rigid back window frame coupled to at least one of the roof bows;

the second roof bow and the back window frame being movable about at least one pivot to a forwardly collapsible position.

14. The system of claim 13 further comprising a stationary roof covering at least a majority of a front seating area of the vehicle, the forward most roof bow being located rearward of at least a majority of the stationary roof.

15. The system of claim 14 wherein the forward most roof bow is pivotally attached to the stationary roof.

16. The system of claim 14 further comprising:

a latching mechanism disengagably connecting the forward mast roof bow to the stationary roof.

17. The system of claim 13 further comprising:

a vehicle body;

a first link having a first end and a second end, the first link being pivotally attached to the vehicle body between the first and second ends;

the rear window frame being pivotally attached to the first end of the first link; and a second link having a first end pivotally attached to the second end of the first link and a second end pivotally attached to the second roof bow.

18. The system of claim 13 further comprising a third roof bow pivotally attached to the second roof bow.

19. The system of claim 13 wherein the roof bows and the back window frame are removable from the vehicle.

20. The system of claim 13 further comprising a tension adjusting mechanism having one end attached to the second roof bow, the tension adjusting mechanism being operable to vary tension in the roof cover.

21. The system of claim 13 further comprising a rear window of the vehicle that is operable between a closed and open position, wherein the window frame has an open lower end for receiving the rear window.

22. The system of claim 13 wherein the back window frame is pivotably coupled to the vehicle.

23. The system of claim 13 further comprising:
a first roof bow;
a stationary roof panel substantially covering at least a front seating area;
a linkage assembly including a roof bow;
a front connector disengagably connecting the roof bow to the stationary roof panel; and
a rear connector disengagably connecting the convertible roof to the vehicle.

24. The system of claim 13 further comprising:
a central pair of connectors disengagably connecting the convertible roof to the vehicle, at least one of the connectors being a pivotable coupling of a linkage assembly to the vehicle.

25. The system of claim 13 further comprising multiple connectors disengagably connecting the convertible roof to the vehicle, all of the connectors being removably attached to the convertible roof to eliminate loose connector parts.

26. The system of claim 13 further comprising:
a stationary roof, and a latching mechanism disengagably connecting the forward most roof bow to the stationary roof.

27. The system of claim 13 further comprising a passenger compartment and a storage compartment rear of the passenger compartment, wherein the convertible roof covers the storage compartment of the vehicle when in its raised position.

28. A convertible roof system for an automotive vehicle body, the system comprising:
a removable and forward opening soft-top roof;
a removable hard-top roof;
multiple first attachment devices adapted to connect the soft-top roof to the vehicle body; and
multiple second attachment devices adapted to connect the hard-top roof to the vehicle body at the same connection locations as used by the first attachment devices.

29. A convertible roof system for an automotive vehicle body, the system comprising:
a removable soft-top roof;
a removable hard-top roof;
multiple first attachment devices adapted to connect the soft-top root to the vehicle body; and
multiple second attachment devices adapted to connect the hard-top roof to the vehicle body at the same connection locations as used by the first attachment devices;
a set of front latches disengagably connectable with a forward section of the soft-top roof; and
a set of rear latches disengagably connectable with a rear section of the soft-top roof.

30. A convertible roof system for an automotive vehicle body, the system comprising:
a removable soft-top roof;
a removable hard-top roof;
multiple first attachment devices adapted to connect the soft-top roof to the vehicle body; and
multiple second attachment devices adapted to connect the hard-top roof to the vehicle body at the same connection locations as used by the first attachment devices;
a forward most roof bow;
a second roof bow; and
a pliable roof cover supported by the roof bows, the soft-top roof being retractable;
a front latch being engageable with the forward most roof bow.

31. The system of claim 30 wherein the soft-top roof includes:
a member having a substantially inverted U-shape with a middle segment thereof extending in a substantially cross-vehicle manner and supporting a rear portion of the roof cover; and
a linkage assembly coupled to the member;
a front latch latch being engageable with at least one of the members and the linkage assembly.

32. A convertible roof system for an automotive vehicle body, the system comprising:
a removable soft-top roof;
a removable hard-top roof;
multiple first attachment devices adapted to connect the soft-top roof to the vehicle body; and
multiple second attachment devices adapted to connect the hard-top roof to the vehicle body at the same connection locations as used by the first attachment devices;
at least one of the first attachment devices including a removable pin which also serves as a pivot point for a portion of the soft-top roof when being retracted.

33. The system of claim 28 wherein the first and second attachment devices include manually actuated hooks.

34. A convertible roof system for an automotive vehicle body, the system comprising:
a removable soft-top roof;
a removable hard-top roof;
multiple first attachment devices adapted to connect the soft-top roof to the vehicle body;
multiple second attachment devices adapted to connect the hard-top roof to the vehicle body at the same connection locations as used by the first attachment devices; and
at least one of the first and second attachment devices including manually pivotable handles.

35. The system of claim 28 further comprising
a retractable back window that remains with the vehicle body when the roofs are removed from the vehicle body.

36. The system of claim 1 wherein the soft-top roof is collapsed in a forward direction to an open roof position.

37. The system of claim 28 wherein at least all of the front and rear attachment devices are removable with the respective roof.

38. An automotive vehicle convertible roof comprising:
a soft-top roof cover;
a first roof bow supporting the soft-top roof cover;
a member spanning in a substantially cross-vehicle direction supporting the soft-top roof cover, wherein the member at least partly acts as a second roof bow; and
a linearly adjustable tensioner to vary the spacing between the roof bow and the member.

39. The convertible roof of claim 38 wherein the tensioner includes:
a first structure having a proximal end attached to the first roof bow;

a second structure attached to the member; and a fastener operably securing the structures together when in a desired relative position.

40. An automotive vehicle convertible roof comprising:

a soft-top roof cover;

a first roof bow supporting the soft-top roof cover;

a member spanning in a substantially cross-vehicle direction supporting the soft-top roof cover; and a linearly adjustable tensioner to vary the spacing between the roof bow and the member wherein the tensioner includes:
　a first structure having a proximal end attached to the first roof bow;
　a second structure attached to the member; and
　a fastener operably securing the structures together when in a desired relative position, wherein the structures are elongated shafts extending in a fore-and-aft direction of the roof.

41. The convertible roof of claim 40 wherein the fastener has a threaded dowel and a manually rotatable knob.

42. The convertible roof of claim 39 wherein one of the structures has a hole and the other of the structures has an elongated slot overlapping the hole, the fastener engaging the hole.

43. The convertible roof of claim 38 wherein the tensioner is adjustable to at least one intermediate position inwardly spaced between end positions.

44. The convertible roof of claim 38 wherein the member at least partly acts as a window frame.

45. The convertible roof of claim 38 wherein the first roof bow and the member are retractable in a forward direction to an open position.

46. The convertible roof of claim 38 wherein the tensioner is attached to substantially horizontally elongated and central segments of the first roof bow and the member.

47. The convertible roof of claim 38 wherein the tensioner operably varies the fore-and-aft spacing between the roof bow and the member.

48. A method of operating a roof system in an automotive vehicle having a stationary roof covering at least a majority of a passenger compartment, a soft-top convertible roof covering at least a majority of a storage compartment, and a removable hard top roof, the method comprising:

(a) forwardly moving the soft-top convertible roof between a covering position and a collapsed position while attached to the vehicle;

(b) disconnecting the soft-top convertible roof from the vehicle;

(c) removing substantially the entire soft-top convertible roof from the vehicle;

(d) positioning the removable hard top roof over at least a majority of the storage compartment; and (e) connecting the removable hard top roof to the vehicle at least four of the same locations as those employed for connecting the soft-top convertible roof to the vehicle.

49. The method of claim 48 further comprising:

(a) forwardly pivoting the soft-top convertible roof from the covering position to the collapsed position; and (b) attaching all connectors, used to connect the soft-top roof and the hard top roof to the vehicle, to at least one of the vehicle and the roofs to eliminate the use of loose connectors.

50. An automotive vehicle convertible roof comprising:

a soft-top cover;

at least one bow supporting the soft-top roof cover; and a linearly moveable tensioner being substantially rigid and operable to move a roof bow and change tautness of the cover; wherein the tensioner is securable at least one intermediate position inwardly spaced between end positions.

51. The convertible roof of claim 50 wherein the tensioner includes:

a first structure having a proximal end attached to the first roof bow;

a second structure attached to the member; and a fastener operably securing the structures together when in a desired relative position.

52. The convertible roof of claim 50 wherein the structures are elongated shafts extending in a fore-and-aft direction of the roof.

53. The convertible roof of claim 50 wherein the fastener has a threaded dowel and a manually rotatable knob.

54. The convertible roof of claim 50 wherein one of the structures has a hole and the other of the structures has an elongated slot overlapping the hole, the fastener engaging the hole.

55. The convertible roof of claim 50 further comprising a member at least partly acting as a second roof bow.

56. The convertible roof of claim 50 further comprising a member at least partly acting as a window frame.

57. The convertible roof of claim 55 wherein the at least one bow and the member are retractable in a forward direction to an open position.

58. The convertible roof of claim 50 wherein the tensioner is attached to substantially horizontally elongated and central segments of the first roof bow and the member.

59. The convertible roof of claim 50 wherein the tensioner operably varies the fore-and-aft spacing between the roof bow and the member.

60. The roof system of claim 1 comprising:

a first link pivotally attached to the vehicle at a first pivot; and a base link coupling the first link to the back window frame.

61. The roof system of claim 60 further comprising a central pair of connectors disengagably connecting the convertible roof to the vehicle, at least one of the connectors being a pivotable coupling of the linkage assembly to the vehicle.

62. The roof system of claim 1 wherein the back window frame is pivotably coupled to the vehicle and the convertible roof is movable from an open position to a closed position while attached to the vehicle.

63. The roof system of claim 1 further comprising: a front latch;

the linkage assembly including a front roof bow, the front latch being rotatably mounted to the roof bow; and the convertible roof being forwardly retractable.

64. The automotive vehicle roof system of claim 6 wherein the front roof section is a stationary rigid roof panel.

* * * * *

UNITED STATES PATENT AND TRADEMARK OFFICE
CERTIFICATE OF CORRECTION

PATENT NO. : 6,866,322 B2
DATED : March 15, 2005
INVENTOR(S) : Michael T. Willard It is certified that error appears in the above-identified patent and that said Letters Patent is hereby corrected as shown below:

Column 7,
Line 36, "fore-and-after" should be -- fore-and-aft --.

Column 11,
Line 48, "root" should be -- roof --.

Column 12,
Line 15, delete second occurrence of "latch".

Column 14,
Line 7, after "securable" insert -- to --.

Signed and Sealed this

Thirteenth Day of September, 2005

JON W. DUDAS
*Director of the United States Patent and Trademark Office*